(12) United States Patent
Qu et al.

(10) Patent No.: US 12,315,136 B2
(45) Date of Patent: *May 27, 2025

(54) VECTOR QUANTIZED AUTO-ENCODER CODEBOOK LEARNING FOR MANUFACTURING DISPLAY EXTREME MINOR DEFECTS DETECTION

(71) Applicant: Samsung Display Co., Ltd., Yongin-si (KR)

(72) Inventors: Shuhui Qu, Fremont, CA (US); Qisen Cheng, Cupertino, CA (US); Janghwan Lee, Pleasanton, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 371 days.

This patent is subject to a terminal disclaimer.

(21) Appl. No.: 17/728,882

(22) Filed: Apr. 25, 2022

(65) Prior Publication Data
US 2023/0267600 A1 Aug. 24, 2023

Related U.S. Application Data

(60) Provisional application No. 63/313,356, filed on Feb. 24, 2022.

(51) Int. Cl.
*G06T 7/00* (2017.01)
*G06N 3/045* (2023.01)
*G06N 3/048* (2023.01)

(52) U.S. Cl.
CPC .............. *G06T 7/001* (2013.01); *G06N 3/045* (2023.01); *G06N 3/048* (2023.01); *G06T 2207/20081* (2013.01); *G06T 2207/20084* (2013.01)

(58) Field of Classification Search
USPC .......................................................... 382/301
See application file for complete search history.

(56) References Cited

U.S. PATENT DOCUMENTS

| 7,020,330 | B2 | 3/2006 | Schröder et al. |
| 7,035,431 | B2 | 4/2006 | Blake et al. |
| (Continued) |

OTHER PUBLICATIONS

Wang, Lu, et al. "Image Anomaly Detection Using Normal Data Only by Latent Space Resampling", Applied Sciences, Sep. 2020; (Year: 2020).*

(Continued)

*Primary Examiner* — Jacky X Zheng
(74) *Attorney, Agent, or Firm* — Lewis Roca Rothgerber Christie LLP (57) ABSTRACT

A system including: a memory, an encoder, a decoder, and a processor, the processor being connected to the memory, the encoder, and the decoder. The system is configured to: receive, at the encoder, an input image, divide, by the encoder, the input image into a plurality of image patches, select, by the encoder, codes corresponding to the plurality of image patches of the input image, from a codebook including the codes. The system is further configured to determine, by the encoder, an assigned code matrix including the codes corresponding to the plurality of image patches of the input image, receive, by the decoder, the assigned code matrix from the encoder. The system is further configured to generate, by the decoder, a reconstructed image based on the assigned code matrix.

19 Claims, 7 Drawing Sheets

(56) References Cited

U.S. PATENT DOCUMENTS

| | | | |
|---|---|---|---|
| 9,002,109 | B2 | 4/2015 | Krishnaswamy et al. |
| 10,430,689 | B2 | 10/2019 | Lin et al. |
| 10,965,948 | B1 | 3/2021 | Appalaraju et al. |
| 11,080,833 | B2 | 8/2021 | Barnes et al. |
| 2002/0122596 | A1 | 9/2002 | Bradshaw |
| 2012/0155550 | A1 | 6/2012 | Wu et al. |
| 2020/0250528 | A1 | 8/2020 | Van den Oord et al. |
| 2020/0304802 | A1* | 9/2020 | Habibian ............... G06F 18/21 |
| 2024/0048724 | A1* | 2/2024 | Qu ......................... H04N 19/94 |
| 2024/0112088 | A1* | 4/2024 | Yu .......................... G06N 3/084 |

OTHER PUBLICATIONS

Wang, Lu, et al., "Image Anomaly Detection Using Normal Data Only by Latent Space Resampling," Applied Sciences, 2020, 19 pages.

EPO Extended European Search Report dated May 30, 2023, issued in corresponding European Patent Application No. 23158608.2 (11 pages).

T. Czimmermann, G. Ciuti, M. Milazzo, M. Chiurazzi, S. Roccella, C. M. Oddo, P. Dario, "Visual-Based Defect Detection and Classification Approaches for Industrial Applications—A Survey", *Sensors* 20 (5) (2020) 1459 (25 pages).

J. Yang, S. Li, Z. Wang, H. Dong, J. Wang, S. Tang, "Using Deep Learning to Detect Defects in Manufacturing: A Comprehensive Survey and Current Challenges", *Materials* 2020, 13, 5755 (23 pages).

J. Lee, S. Qu, Y. Kang, W. Jang, "Multimodal Machine Learning for Display Panel Defect Layer Identification", *2021 32nd Annual SEMI Advanced Semiconductor Manufacturing Conference (ASMC)*, IEEE, 2021, pp. 1-7.

T. Nakazawa, D. V. Kulkarni, "Anomaly Detection and Segmentation for Wafer Defect Patterns Using Deep Convolutional Encoder-Decoder Neural Network Architectures in Semiconductor Manufacturing", *IEEE Transactions on Semiconductor Manufacturing*, 32 (2019) 250-256.

J. Lee, 16-4: "*Invited Paper*: Region-Based Machine Learning for OLED Mura Defects Detection", *SID Symposium Digest of Technical Papers*, vol. 52, Wiley Online Library, 2021, pp. 200-203.

Y. Li, W. Zhao, J. Pan, "Deformable Patterned Fabric Defect Detection With Fisher Criterion-Based Deep Learning", *IEEE Transactions on Automation Science and Engineering*, vol. 14, No. 2, Apr. 2017, pp. 1256-1264.

S. Mei, Y. Wang, G. Wen, Automatic Fabric Defect Detection with A Multi-Scale Convolutional Denoising Autoencoder Network Model:, *Sensors*, 2018, 1064 (18 pages).

S. Vaikundam, T.-Y. Hung, L. T. Chia, "Anomaly Region Detection And Localization In Metal Surface Inspection", 2016 *IEEE International Conference on Image Processing (ICIP)*, IEEE, 2016, pp. 759-763.

R. Ren, T. Hung, K. C. Tan, A Generic Deep-Learning-Based Approach for Automated Surface Inspection, *IEEE Ttransactions on Cybernetics*, vol. 48, No. 3, Mar. 2018, pp. 929-940.

J. Lee, W. Xiong, W. Jang, "Trace Data Analytics with Knowledge Distillation: DM: Big Data Management and Mining", *2020 31st Annual SEMI Advanced Semiconductor Manufacturing Conference (ASMC)*, IEEE, 2020, pp. 1-8.

J. Deng, W. Dong, R. Socher, LJ Li, K. Li, L. Fei-Fei, "Imagenet: A Large-Scale Hierarchical Image Database", 2009 *IEEE conference on computer vision and pattern recognition*, IEEE, 2009, pp. 248-255.

P. Bergmann, M. Fauser, D. Sattlegger, C. Steger, "Uninformed Students: Student-Teacher Anomaly Detection with Discriminative Latent Embeddings", arXiv:1911.02357v2 [cs.CV], Mar. 18, 2020 (11 pages).

N. Cohen, Y. Hoshen, "Sub-Image Anomaly Detection with Deep Pyramid Correspondences", arXiv:2005.02357v3 [cs.CV], Feb. 3, 2021 (17 pages).

T. Defard, A. Setkov, A. Loesch, R. Audigier, "PaDiM: A Patch Distribution Modeling Framework for Anomaly Detection and Localization", arXiv:2011.08785v1 [cs.CV] Nov. 17, 2020 (7 pages).

K.Roth, et al., "Towards Total Recall in Industrial Anomaly Detection", arXiv preprint arXiv:2106.08265 , 2021 (18 pages).

A. Ramesh, M. Pavlov, G. Goh, S. Gray, C. Voss, A. Radford, M. Chen, I. Sutskever, "Zero-Shot Text-to-Image Generation", arXiv preprint arXiv:2102.12092 (2021).

P. Esser, R. Rombach, B. Ommer, "Taming Transformers for High Resolution Image Synthesis"; *Proceedings of the IEEE/CVF Conference on Computer Vision and Pattern Recognition*, 2021, pp. 12873-12883.

A. Razavi, A. van den Oord, O. Vinyals; "Generating Diverse High-Fidelity Images with VQ-VAE-2"; *Advances in neural information processing systems*, 2019, pp. 14866-14876.

A. van den Oord, O. Vinyals, K. Kavukcuoglu; "Neural Discrete Representation Learning", *Proceedings of the 31st International Conference on Neural Information Processing Systems*, 2017, pp. 6309-6318.

A. Dosovitskiy, L. Beyer, A. Kolesnikov, D. Weissenborn, X. Zhai, T. Unterthiner, M. Dehghani, M. Minderer, G. Heigold, S. Gelly, et al., An Image Is Worth 16x16 Words: Transformers For Image Recognition At Scale, *International Conference on Learning Representations*, 2020 (22 pages).

S. Khan, M. Naseer, M. Hayat, S. W. Zamir, F. S. Khan, M. Shah, "Transformers in Vision: A Survey", arXiv preprint arXiv:2101.01169 (2021).

P. Mishra, R. Verk, D. Fornasier, C. Piciarelli, G. L. Foresti, VT-ADL: A Vision Transformer Network for Image Anomaly Detection and Localization, arXiv preprint arXiv:2104.10036 (2021) (6 pages).

P. Bergmann, M. Fauser, D. Sattlegger, C. Steger, "MVTec Ad—A Comprehensive Real-World Dataset for Unsupervised Anomaly Detection" *Proceedings of the IEEE/CVF Conference on Computer Vision and Pattern Recognition*, 2019, pp. 9592-9600.

Y. Huang, C. Qiu, Y. Guo, X. Wang, K. Yuan, "Surface Defect Saliency of Magnetic Tile", *2018 IEEE 14th International Conference on Automation Science and Engineering (CASE)*, Munich, Germany, Aug. 20-24, 2018, 612-617.

J. Masci, U. Meier, D. Ciresan, J. Schmidhuber, G. Fricout, A. Mittal, "Steel Defect Classification with Max-Pooling Convolutional Neural Networks", *WCCI 2012 international Joint Conference on Neural Networks (IJCNN)*, IEEE, 2012, (6 pages).

S. Cheon, H. Lee, C. O. Kim, S. H. Lee, "Convolutional Neural Network for Wafer Surface Defect Classification and the Detection of Unknown Defect Class", *IEEE Transactions on Semiconductor Manufacturing* 32 (2) (2019) 163-170.

Y. He, K. Song, Q. Meng, Y. Yan, "An End-to-End Steel Surface Defect Detection Approach via Fusing Multiple Hierarchical Features", *IEEE Transactions on Instrumentation and Measurement* 69 (4) (2019) 1493-1504.

M. K. Ferguson, A. Ronay, YTT Lee, K. H. Law, "Detection and Segmentation of Manufacturing Defects with Convolutional Neural Networks and Transfer Learning", *Smart and sustainable manufacturing systems* 2 (2018).

H. Han, WY Wang, BH Mao, "Borderline—SMOTE: A New Over-Sampling Method in Imbalanced Data Sets Learning" *International Conference on Intelligent Computing*, Springer, 2005, pp. 878-887.

H. He, E. A. Garcia, "Learning from Imbalanced Data", *IEEE Transactions On Knowledge and Data Engineering*, vol. 21, No. 9, Sep. 2009, pp. 1263-1284.

Y. Koizumi, S. Murata, N. Harada, S. Saito, H. Uematsu, "SNIPER: Few Shot Learning for Anomaly Detection To Minimize False-Negative Rate with Ensured True-Positive Rate", *CASSP 2019-2019 IEEE International Conference on Acoustics, Speech and Signal Processing (ICASSP)*. IEEE, 2019, pp. 915-919.

Lv, Qianwen, and Yonghong Song, "Few-shot Learning Combine Attention Mechanism-Based Defect Detection in Bar Surface." *ISIJ International*, vol. 59, No. 6 (2019): 1089-1097.

(56) References Cited

OTHER PUBLICATIONS

L. Ruff, R. Vandermeulen, N. Goernitz, L. Deecke, S.A. Siddiqui, A. Binder, E. Müller, and M. Kloft., "Deep One-Class Classification", *International Conference on Machine Learning*, PMLR, 2018, (10 pages).

J. Yi, S. Yoon, "Patch SVDD: Patch-level SVDD for Anomaly Detection and Segmentation", arXiv:2006.16067v2, 2020 (22 pages).

P. Perera, V. M. Patel, "Learning Deep Features for One-Class Classification". *IEEE Transactions on Image Processing*, 28 (11) (2019) 5450-5463.

P. Oza, V. M. Patel, "One-Class Convolutional Neural Network", *IEEE Signal Processing Letters*, 26 (2) (2018) 277-281.

I. Golan, R. El-Yaniv, "Deep Anomaly Detection Using Geometric Transformations", arXiv preprint arXiv:1805.10917, 2018 (17 pages).

M. Sakurada, T. Yairi, "Anomaly Detection Using Autoencoders with Nonlinear Dimensionality Reduction"; *Proceedings of the MLSDA*, 2014 $2^{nd}$ workshop on Machine Learning for Sensory Data Analysis, 2014, pp. 4-11.

G. Kang, S. Gao, L. Yu, D. Zhang, "Deep Architecture for High-Speed Railway Insulator Surface Defect Detection: Denoising Autoencoder with Multitask Learning", *IEEE Transactions on Instrumentation and Measurement* vol. 68, No. 8, 2019, pp. 2679-2690.

R. Chalapathy, A. K. Menon, S. Chawla, "Anomaly Detection Using One-Class Neural Networks", arXiv preprint arXiv:1802.06360, 2019, (13 pages).

M. Sabokrou, M. Khalooei, M. Fathy, E. Adeli, "Adversarially Learned One-Class Classifier for Novelty Detection", *Proceedings of the IEEE Conference on Computer Vision and Pattern Recognition*, 2018, pp. (10 pages).

S. Akcay, A. Atapour-Abarghouei, T. P. Breckon, "GANomaly: Semi-Supervised anomaly Detection via Adversarial Training", arXiv preprint arXiv:1805.06725 , 2018, (16 pages).

S. Venkataramanan, KC Peng, R. V. Singh, A. Mahalanobis, "Attention Guided Anomaly Localization in Images", *European Conference on Computer Vision*, Springer, 2020, (19 pages).

B. Zong, Q. Song, M. R. Min, W. Cheng, C. Lumezanu, D. Cho, H. Chen, "Deep Autoencoding Gaussian Mixture Model for Unsupervised Anomaly Detection", : International Conference on Learning Representations, 2018 (19 pages).

M. Rudolph, B. Wandt, B. Rosenhahn, Same Same But DifferNet: Semi-Supervised Defect Detection with Normalizing Flows, arXiv:2008.12577v1 [cs.CV] Aug. 28, 2020 (10 pages).

D. Gudovskiy, S. Ishizaka, K. Kozuka, "CFLOW-AD: Real-time unsupervised Anomaly Detection with Localization via Conditional Normalizing Flows" arXiv preprint arXiv:2107.12571, 2021 (11 pages).

H. M. Schlüter, J. Tan, B. Hou, B. Kainz, Self-Supervised Out-of-Distribution Detection and Localization with Natural Synthetic Anomalies (NSA), arXiv preprint arXiv:2109.15222, 2021 (12 pages).

C.-L. Li, K. Sohn, J. Yoon, T. Pfister, "CutPaste: Self-Supervised Learning for Anomaly Detection and Localization", arXiv:2104.04015v1 [cs.CV], Apr. 8, 2021 (28 pages).

\* cited by examiner

VECTOR QUANTIZED AUTO-ENCODER CODEBOOK LEARNING FOR MANUFACTURING DISPLAY EXTREME MINOR DEFECTS DETECTION

CROSS-REFERENCE TO RELATED APPLICATION(S)

This application claims priority to and the benefit of U.S. Provisional Patent Application No. 63/313,356, filed on Feb. 24, 2022, the entire content of which is incorporated by reference herein.

FIELD

The present application generally relates to detecting defects in displays, and more particularly to vector quantized auto-encoder codebook learning for manufacturing display extreme minor defects detection.

BACKGROUND

Machine learning is increasingly utilized to achieve automated visual defect detection. However, the lack of defect data may make the defect detection challenging. Some approaches, such as few-shot learning or resampling, have been reported to mitigate the challenge. Nonetheless, the issue of defect scarcity remains unsolved due to limited performance and utility.

The above information in the Background section is only for enhancement of understanding of the background of the technology and therefore it should not be construed as admission of existence or relevancy of the prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to vector quantized auto-encoder codebook learning for manufacturing display extreme minor defects detection.

In one or more embodiments, a system includes: a memory, an encoder; a decoder; and a processor, the processor being connected to the memory, the encoder, and the decoder, wherein the system is configured to: receive, at the encoder, an input image; divide, by the encoder, the input image into a plurality of image patches; select, by the encoder, codes corresponding to the plurality of image patches of the input image, from a codebook including the codes; determine, by the encoder, an assigned code matrix including the codes corresponding to the plurality of image patches of the input image; receive, by the decoder, the assigned code matrix from the encoder; generate, by the decoder, a reconstructed image based on the assigned code matrix.

In one or more embodiments, the codes corresponding to the plurality of image patches of the input image are selected from the codebook using a look-up function, wherein the look-up function, the codebook, and the assigned code matrix are stored in the memory. In one or more embodiments, the system is further configured to: extract, by the encoder, latent features from the plurality of image patches of the input image; and determine, by the encoder, a latent features matrix including the latent features extracted from the plurality of image patches of the input image. In one or more embodiments, the look-up function is configured to select a nearest code as an assignment for each of the latent features in the latent feature matrix to determine the assigned code matrix.

In one or more embodiments, the encoder is configured to select a code corresponding to an image patch of the plurality of image patches of the input image from the codebook by comparing similarity measures between a latent feature representation of the image patch in the latent feature matrix and a corresponding code in the codebook. In one or more embodiments, the similarity measures include an euclidean distance or a mahalanobis distance between the latent feature representation of the image patch in the latent feature matrix and the corresponding code in the codebook. In one or more embodiments, the assigned code matrix includes the codes corresponding to the plurality of image patches of the input image.

In one or more embodiments, a code from among the codes in the assigned code matrix is assigned to an image patch of the plurality of image patches of the input image based on a vector quantization of a latent feature corresponding to the image patch. In one or more embodiments, a vector quantization loss of the system includes a reconstruction loss that occurs during generation of the reconstructed image and a loss that occurs during the vector quantization of latent features corresponding to the plurality of image patches of the input image.

In one or more embodiments, the system further includes a patch-wise discriminator network configured to operate as a generative adversarial network to determine an adversarial training loss between the input image and the reconstructed image. In one or more embodiments, a total loss of the system in generating the reconstructed image from the input image includes the vector quantization loss and the adversarial training loss.

In one or more embodiments, the system is further configured to: receive, by the encoder, a test input image; divide, by the encoder, the test input image into a plurality of image patches; extract, by the encoder, latent features from the plurality of image patches of the test input image; encode, by the encoder, each of the plurality of image patches into a latent feature vector based on the extracted latent features; assign, by the encoder, a code to each of the plurality of image patches to determine assigned codes of the plurality of image patches; determine, by the encoder, a patch-set including the assigned codes; determine, by the encoder, an anomaly score of each of the assigned codes of the patch-set; compare, by the encoder, the anomaly score of each of the assigned codes of the patch-set with a threshold; determine, by the encoder, a defect in one or more of the plurality of image patches based on a result of the comparison.

In one or more embodiments, a code from the codebook that is of a shortest distance to the latent feature vector of an image patch of the plurality of image patches among the codes in the codebook is assigned to the image patch. In one or more embodiments, the anomaly score of each of the assigned codes of the patch-set is determined based on a probability density function.

In one or more embodiments, a method includes: receiving, at an encoder, an input image; dividing, at the encoder, the input image into a plurality of image patches; selecting, by the encoder, codes corresponding to the plurality of image patches of the input image, from a codebook including the codes; determining, by the encoder, an assigned code matrix including the codes corresponding to the plurality of image patches of the input image; receiving, by a decoder, the assigned code matrix from the encoder; generating, by the decoder, a reconstructed image based on the assigned code matrix.

In one or more embodiments, the codes corresponding to the plurality of image patches of the input image are selected from the codebook using a look-up function, wherein the method further includes: extracting, by the encoder, latent features from the plurality of image patches of the input image; and determining, by the encoder, a latent features matrix including the latent features extracted from the plurality of image patches of the input image.

In one or more embodiments, the look-up function is configured to select a nearest code as an assignment for each of the latent features in the latent feature matrix to determine the assigned code matrix, and wherein the encoder is configured to select a code corresponding to an image patch of the plurality of image patches of the input image from the codebook by comparing similarity measures between a latent feature representation of the image patch in the latent feature matrix and a corresponding code in the codebook.

In one or more embodiments, a code from among the codes in the assigned code matrix is assigned to an image patch of the plurality of image patches of the input image based on a vector quantization of a latent feature corresponding to the image patch, wherein a vector quantization loss includes a reconstruction loss that occurs during generation of the reconstructed image and a loss that occurs during the vector quantization of latent features corresponding to the plurality of image patches of the input image, and wherein a total loss for generating the reconstructed image from the input image includes the vector quantization loss and an adversarial training loss.

In one or more embodiments, the method further includes: extracting, by the encoder, latent features from the plurality of image patches of the input image; encoding, by the encoder, each of the plurality of image patches into a latent feature vector based on the extracted latent features; assigning, by the encoder, a code to each of the plurality of image patches to determine assigned codes of the plurality of image patches; determining, by the encoder, a patch-set including the assigned codes; determining, by the encoder, an anomaly score of each of the assigned codes of the patch-set; compare, by the encoder, the anomaly score of each of the assigned codes of the patch-set with a threshold; determine, by the encoder, a defect in one or more of the plurality of image patches based on a result of the comparison.

In one or more embodiments, a non-transitory computer readable storage medium configured to store instructions that, when executed by a processor included in a computing device, cause the computing device to: receive, at an encoder of the computer device, an input image; divide, at the encoder, the input image into a plurality of image patches; select, by the encoder, codes corresponding to the plurality of image patches of the input image, from a codebook including the codes; determine, by the encoder, an assigned code matrix including the codes corresponding to the plurality of image patches of the input image; receive, by a decoder of the computer device, the assigned code matrix from the encoder; generate, by the decoder, a reconstructed image based on the assigned code matrix.

BRIEF DESCRIPTION OF THE DRAWINGS

These and other features of some example embodiments of the present disclosure will be appreciated and understood with reference to the specification, claims, and appended drawings, wherein:

Aspects, features, and effects of embodiments of the present disclosure are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

The detailed description set forth below in connection with the appended drawings is intended as a description of some example embodiments of a system and a method for vector quantized auto-encoder codebook learning for manufacturing display extreme minor defects detection provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the scope of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the present disclosure. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

In some embodiments, one or more outputs of the different embodiments of the methods and systems of the present disclosure may be transmitted to an electronics device coupled to or having a display device for displaying the one or more outputs or information regarding the one or more outputs of the different embodiments of the methods and systems of the present disclosure.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

In recent years, the television (TV) and mobile display industry has grown rapidly. As new types of display panel modules and production methods are being designed, enhanced equipment and method to control quality may be desired to maintain the production quality. Defects in the display panels may lead to cost increase and loss in the manufacturing process, and therefore, monitoring the defects during production may be desired. To enhance equipment and quality control, effective defect detection system for defects may be implemented with image of display panels gathered.

Machine learning is increasingly utilized to achieve automated visual defect detection. However, the lack of defect data may make the defect detection challenging. Some approaches, such as few-shot learning or resampling, have been reported to mitigate the challenge. Nonetheless, the issue of defect scarcity remains unsolved due to their usually limited performance and utility.

Vision-based defect detection for quality control has been a prominent research and engineering topic in manufacturing. Powered by the advancement of machine learning, automated visual inspection methods have been developed for various applications, including identification of defective panels and wafers in the display or semiconductor manufacturing, fabric defect detection in textile production, and surface inspection in the metal processing, etc.

One or more learning-based methods assume that both the normal and defect data are available or equally sufficient. Based on this assumption, models can be effectively trained to extract visual patterns and correspond them to different classes. Despite the success in certain scenarios, this assumption often fails because it is challenging and costly to obtain enough defect samples covering all the potential defect variations. Consequently, it remains challenging for defect detection in common industrial scenarios where defect samples are relatively rare or unavailable.

To mitigate the insufficient defect sample issue, in some cases, a one-class method may be used, which may be pre-trained on large datasets such as ImageNet to extract deep representations of the normal data. In such a case, at test time, the anomalous samples can be distinguished via distance-based representation matching (e.g., k-Nearest-Neighbors algorithm). Such methods learn to model the normal data distribution, therefore eliminating defect samples' requirement for training models. In one or more cases, such methods (e.g., PatchCore) may achieve state-of-the-art performance by using a memory bank technique to retain the normal contexts. The principle of this technique is to effectively subsample from the normal data points in the latent space such that most of the normal information can be leveraged for representation matching at test time. However, in some cases, these representation learning approaches are not trained end-to-end and may require extra tuning. For example, the performance of a representation learning method (e.g., PatchCore) may be sensitive to the selection of coverage of the normal samples. Also, some methods for defect detection can only work with normal data with similar visual patterns whose consistency of homogeneous normal objects essentially eases the learning and matching of representations. However, such a requirement poses challenges for real-world scenarios, where the patterns of inspection components are diverse.

In order to effectively detect defects in real world scenarios, multiple models may be needed to be trained and maintained in parallel. However, such an approach may have a cost of time and computational powers.

One or more embodiments of the present disclosure may provide a solution to the challenges in the defect detection using machine learning by a Patch Vector-Quantized Auto-Encoder (PVQAE) system that is only trained on non-defect images. In one or more embodiments, PVQAE system may mitigate the above mentioned challenges of defect detection. PVQAE divides the image into patches and learns a codebook from the image patches. A code in the codebook represents the feature pattern of a patch. Anomaly scores can then be estimated from codes assigned to the image patches. PVQAE system can achieve state-of-the-art performance on defect detection.

Following the research of one-class methods, in one or more embodiment, the PVQAE system of the present disclosure may be trained without defect data. In one or more embodiments, the PVQAE system may use vector quantization. Vector quantization is a technique that enables the learning of expressive representations stored in a discrete codebook. In one or more embodiments, the context-rich codebook may contribute to state-of-the-art performance in many vision tasks, including image generation and synthesis. Moreover, the codebook can be easily integrated into generative models as an end-to-end framework. By introducing this technique to the one-class auto-encoder architecture, in one or more embodiments, the PVQAE system learns distinctive normal representations in an end-to-end fashion. In addition, the high expressivity of the learned codebook may allow the PVQAE system to be trained for multiple objects incorporating a vast span of visual patterns. As such, the PVQAE system of the present disclosure may eliminate the need for extra tuning and dataset-specific trade-offs and may alleviate the burden to train multiple models.

In one or more embodiments, with a convolutional neural network (CNN) as the encoder, each codebook entry may attend to localized visual patterns in an image. Unlike natural images, images captured in manufacturing settings usually involve complex yet resembling patterns distributed across image constituents. Based on this observation, the retention of global information may be needed in codebook learning. In one or more embodiments, in case of vision transformer and variations, the multi-head attention (MHA) mechanism may have superior capability in capturing the relationship between long-range contexts. In one or more embodiments, MHA and CNN may be combined as the encoder backbone to enhance local and global information expression.

Based on the learned codebook, the one-class detection framework or PVQAE system of the present disclosure may calculate the anomaly score for each image patch by generating the posterior probability on retrieved codes, and identify the defect through the value of the anomaly score.

In one or more embodiments, the PVQAE system of the present disclosure consists of two parts: (1) a patch vector-quantization auto-encoder that learns a codebook incorporating representations of the normal data, and (2) a defect detector that identifies defects based on the learned codebook. The PVQAE system of the present disclosure quantizes latent features into indices of a codebook. For example, the PVQAE system of the present disclosure trains an encoder network to build a discrete embedding table as well as a decoder network that looks up for an index in the embedding table for the reconstruction of each image patch (e.g., see FIG. 1). Both the encoder and decoder may be convolutional neural networks (CNNs). At test time, the encoder-decoder pair may utilize the learned codebook to generate an index matrix for all patches in the test image. By looking at the joint probability of codes corresponding to the indices, the defect detector calculates a score matrix that can be used for patch-wise defect identification.

Figure 1:
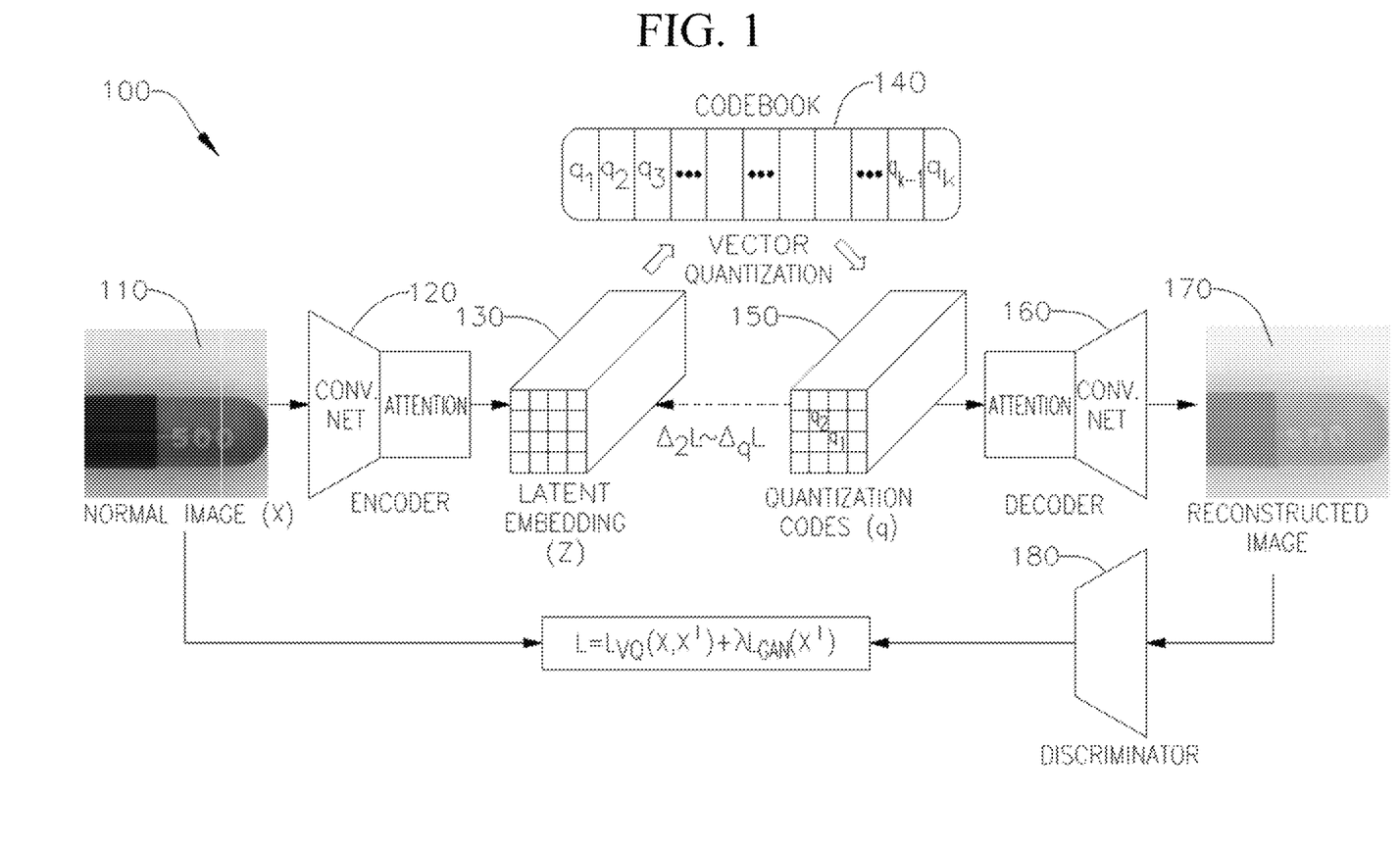
FIG. 1 illustrates a codebook learning of a patch vector-quantized auto-encoder (PVQAE) system, in accordance with some embodiments.

FIG. 1 illustrates a codebook learning of the PVQAE system of the present disclosure.

PVQAE system 100 quantizes latent features into a codebook of entries, (i.e. a latent feature matrix) with a pair of encoder (E) and decoder (G) networks. For example, PVQAE system 100 uses vector quantization to learn a codebook for the whole dataset, thus the dataset can be expressed by the codebook. In one or more embodiments, a code represents the display panel's image patches' features.

For example, at training, the encoder (E) 120 reads in images (e.g., image (x) 110) and extracts and stores visual patterns into a codebook (Q) 140, whereas the decoder (G) 160 aims to select a proper code index for each image patch and tries to reconstruct the input images based on the selected codes.

In one or more embodiments, the latent embedding codebook (Q) 140 may be represented as $Q \in R^{(K \times n_z)}$, where K is the number of the discrete codes in the codebook, and $n_z$ is the dimensionality of the latent embedding vector $q_k \in R^{(n_z)}$, $k \in 1, 2, \ldots, K$.

For example, during training of the PVQAE system 100, as shown in FIG. 1, the encoder (E) 120 receives an image (x) 110, where $x \in R^{(H \times W \times 3)}$ and outputs the latent feature matrix (z) 130. Here, "H" is the height of the image (x) 110, W is the width of the image (x) 110, and number "3" represents the number of channel of the image (x) 110 (e.g., red, green, blue).

For example, in the method of FIG. 1, when the input image (x) is received at the encoder (E), the input image (x) may be divided into a plurality of image patches. In one or more embodiments, a latent feature from each of the plurality of patches may be extracted to determine the latent feature matrix (z) 130, where $z \in R^{(h \times w \times n_z)}$ and z=E(x). Here, h is the height of the latent feature matrix (z) 130, w is the width of the latent feature matrix (z) 130, and $n_z$ represents the hidden vector size of the latent feature matrix (z) 130.

For example, after the latent feature matrix (z) 130 is determined by the encoder (E) 120, vector quantization may be used to learn the codebook (Q) 140 to assign a code from the codebook (Q) 140 to each of the plurality of latent features of the latent feature matrix (z). Here, each of the latent features in the latent feature matrix (z) corresponds to each patch of the plurality of patches from the input image (x).

In one or more embodiments, the PVQAE system 100 may further include a memory and a processor, and the latent feature matrix (z) 130 may be determined by the processor based on the latent features extracted from the plurality of image patches and in one or more embodiments, the latent feature matrix (z) 130 may be stored in the memory of the PVQAE system 100.

For example, after the latent feature matrix (z) 130 is determined by the encoder (E) 120, in the forward pass, a code for each image patch is selected (or assigned) from the codebook (Q) 140 using a look-up function q(.) by the encoder (E) 120 or the processor of the PVQAE system 100. In one or more embodiments, the look-up function q(.) and the codebook (Q) 140 may be stored in the memory of the PVQAE system. By comparing the similarity measures (e.g., euclidean distance, mahalanobis distance, etc.) between the latent feature representation of an input image patch in the latent feature matrix (z) 130 and each code in the codebook (Q) 140, the look-up function q(.) selects the nearest code as an assignment for each latent feature in the latent feature matrix (z) 130 to generate the assigned code matrix (q) 150. For example, in one or more embodiments, by comparing the euclidean distance between the latent feature representation of an input patch in the latent feature matrix (z) 130 and each code in the codebook (Q) 140, the look-up function q(.) selects the nearest code as an assignment for each latent feature in the latent feature matrix (z) 130. In one or more embodiments, the assigned code matrix (q) 150 may be generated by the encoder (E) 120 or by the processor of the PVQAE system 100.

For example, an assignment in the assigned code matrix (q) 150 may be represented as:

$$z_q^{i,j} = q(z_{i,j}) = \mathrm{argmin} \|z_{i,j} - q_k\|_2^2 \quad (1)$$

For example, $z_q^{i,j}$ may represent an element of the assigned code matrix (q) 150.

For example, in one or more embodiments, a code may be assigned to each input image patch based on vector quantization of the latent feature corresponding to the input image patch. For example, in the codebook learning of the PVQAE system 100, the concept of vector quantization may be used while determining the assigned code matrix (q) 150 by selecting a code for each image patch from the codebook (Q) 140 with a look-up function q(.).

The assigned code matrix (q) 150 is then passed to the decoder (G) 160 to generate a reconstructed image or a reconstructed input image ($\hat{x}$) from the elements of the assigned code matrix (q) 150. In one or more embodiments, the assigned code matrix (q) 150 has the same shape as the latent feature matrix (z) 130. For example, the assigned code matrix (q) 150 may be the quantized version of the latent feature matrix (z) 130. The assigned code matrix (q) 150 is then passed into the decoder (G) 160, which is an unsampling network that takes in the h×w×nz feature matrix and output H×W×3 image.

In one or more embodiments, the reconstructed input image ($\hat{x}$) may be represented as:

$$\hat{x} = G(z_q) = G(q(E(x))) \quad (2)$$

The difference between reconstructed image ($\hat{x}$) and the corresponding input image x is used as the guidance for the PVQAE system 100.

In one or more embodiments, the argmin operand is not differentiable during backpropagation. The gradient of this step may be approximated by using the straight-through estimator (STE) and directly pass the gradients from q(z) to z, so that the reconstruction loss may be incorporated with the loss for the neural discrete representation learning. As such, the vector quantization loss function may be represented as:

$$L_{VQ}(E,G,Z) = \|\hat{x}-x\|_2^2 + \|sg[E(x)]-q\|_2^2 + \beta \|sg[E(x)]-q\|_2^2 \quad (3)$$

In equation (3), the first term $\|\hat{x}-x\|_2^2$ represents the reconstruction loss (e.g., the loss during the generation of the reconstructed image ($\hat{x}$)). Also, in equation (3), the second and third terms $\|sg[E(x)]-q\|_2^2 + \beta\|sg[E(x)]-q\|_2^2$ represent vector quantization losses.

Further, in equation (3), the sg function sg[E(x)] represents the stop gradient operand that enables the zero partial derivatives, q is the code embedding, and β is the hyperparameter.

In one or more embodiments, the adversarial training may be incorporated in the codebook learning to enhance the expressivity of learned embeddings in the latent feature space. For example, in one or more embodiments, as shown in FIG. 1, a patch-wise discriminator network (D) 180 may be added to the encoder-decoder framework (e.g., including the encoder (E) 120 and decoder (G) 160) as in the generative adversarial network (GAN). An adversarial training loss $L_{GAN}$ may also appended to encourage the PVQAE system 100 to differentiate between the original image (x) 110 and the reconstructed image ($\hat{x}$) 170. In one or more embodiments, the patch-wise discriminator network (D) 180 may determine the adversarial training loss $L_{GAN}$ and the total loss L of the PVQAE system 100.

The adversarial training loss between the original input image (x) 110 and the reconstructed image ($\hat{x}$) 170 may be represented as:

$$L_{GAN}((E,G,Q),D) = \log(D(x)) + \log(1-D(\hat{x})) \quad (4)$$

As a whole, the total loss of the PVQAE system 100 training is:

$$L = \mathrm{argmin}_{E,G,Q} \max_D L_{VQ}(E,G,Z) + \|L_{GAN}((E,G,Q),D) \quad (5)$$

In one or more embodiments, equation (5) or the term "L" may represent the total loss of the PVQAE system 100 during training. For example, the term "L" in equation (5) essentially incorporates the vector quantization loss "$L_{VQ}(E, G, Z)$" and the GAN loss or the adversarial training loss between the original image (x) 110 and the reconstructed image ($\hat{x}$) 170 "$L_{GAN}$ ((E, G, Q), D)". In equation (5) "$\lambda$" is the hyperparameter that can be adaptively tuned.

Figure 2A:
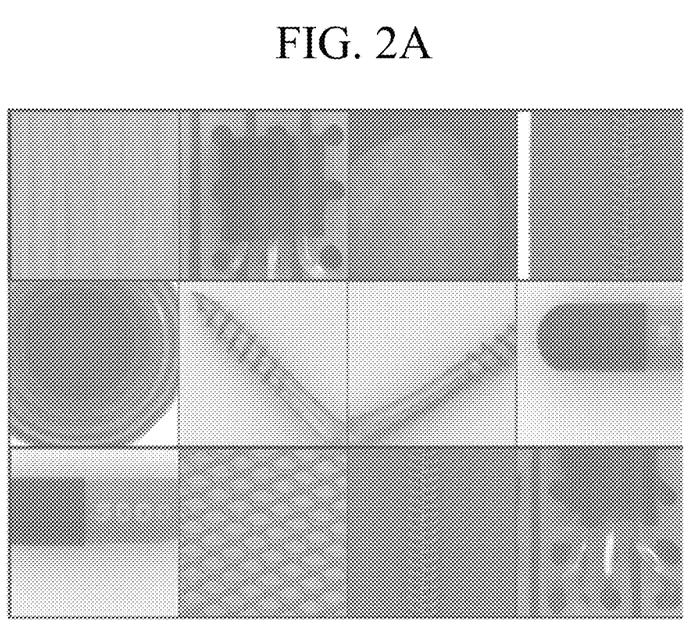
FIG. 2A illustrates an input image and FIG. 2B illustrates a reconstructed image generated from the input image of FIG. 2A, by the PVQAE system of FIG. 1, in accordance with some embodiments.
Figure 2B:
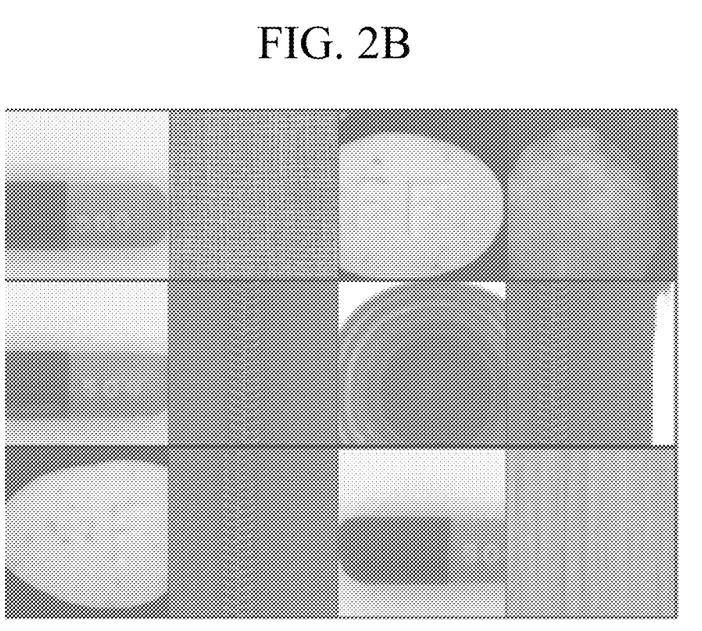
Figure 2C:
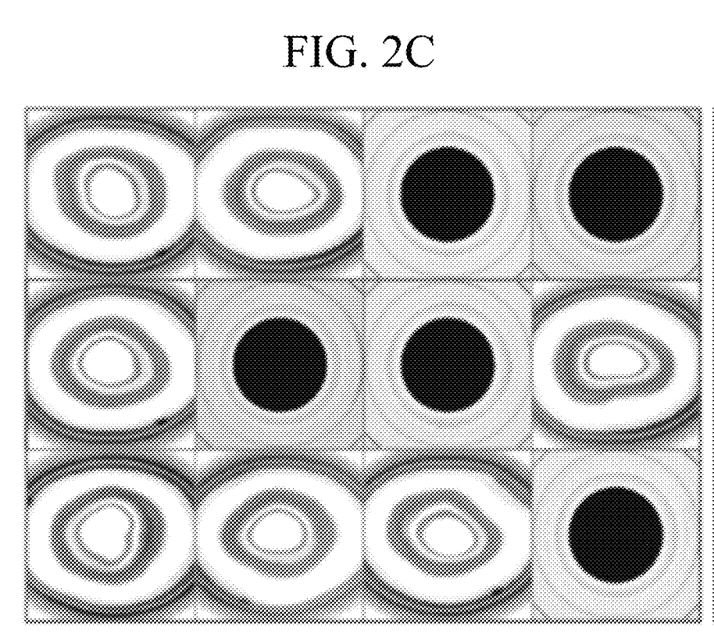
FIG. 2C illustrates an input image and FIG. 2D illustrates a reconstructed image generated from the input image of FIG. 2C, by the PVQAE system of FIG. 1, in accordance with some embodiments.
Figure 2D:
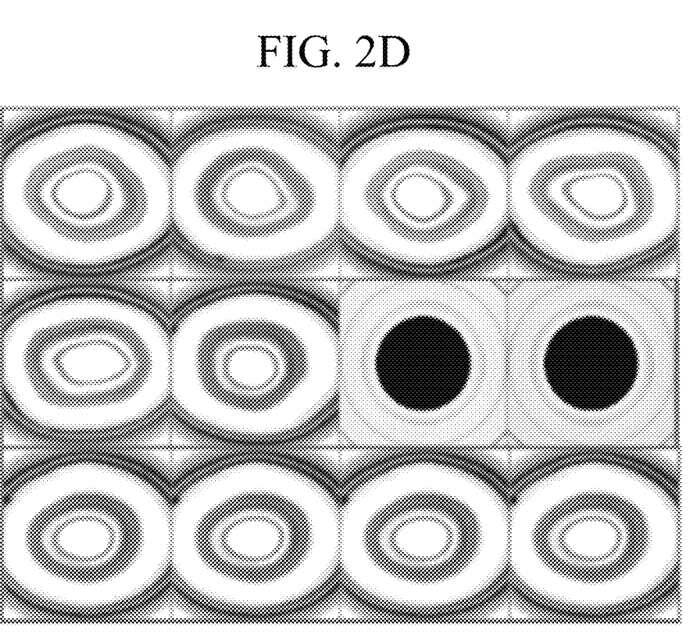
Figure 2E:
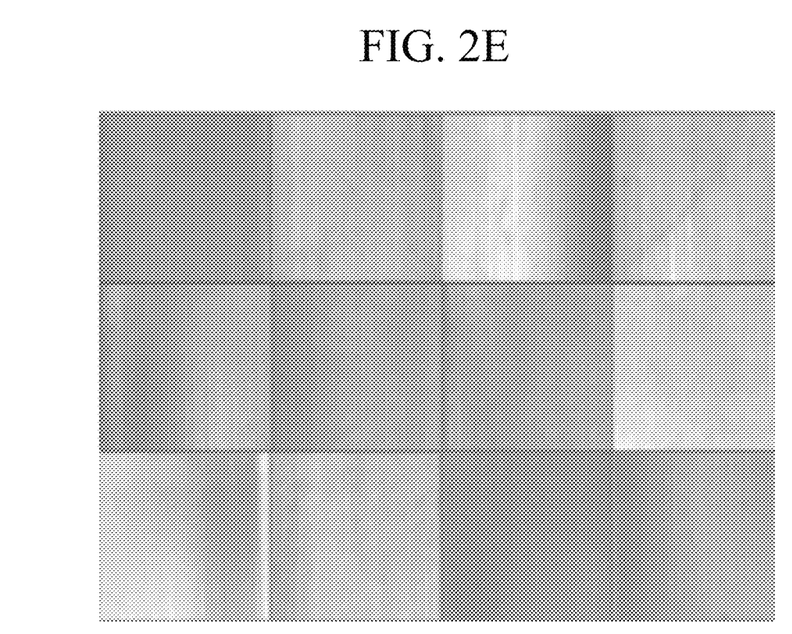
FIG. 2E illustrates an input image and FIG. 2F illustrates a reconstructed image generated from the input image of FIG. 2E, by the PVQAE system of FIG. 1, in accordance with some embodiments.
Figure 2F:
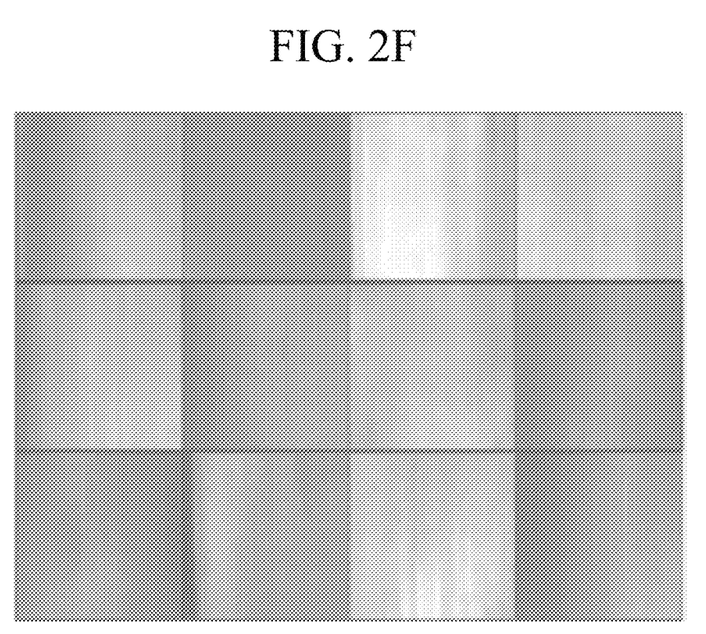

In one or more embodiments, each of FIGS. 2A, 2C, and 2E illustrates an input image (e.g., the input image (x) 110 of FIG. 1) and each of FIGS. 2B, 2D, and 2F illustrates a reconstructed image (e.g., the reconstructed image ($\hat{x}$) 170 of FIG. 1) generated from the input image of FIG. 2A, by the PVQAE system 100 of FIG. 1.

In one or more embodiments, real-world images from production line may incorporate sophisticated visual patterns that contain subtle defective traits. In order to learn an effective codebook from such complex datasets, it may be desirable to adopt a model that can concurrently (e.g., simultaneously) learn local features and understand the global composition of these local features. By encoding the information of both perspectives, the product image can be represented by a series of locally vivid as well as globally coherent perceptional codes. In order to achieve this, on top of convolutional layers, the multi-head self-attention layer may be adopted to learn the inter-correlation dependencies between elements within a sequence (i.e. words for language tasks or image patches for vision tasks). As a consequence, the PVQAE system 100 can learn a codebook with richer perceptions of complex industrial products.

In one or more embodiments, PVQAE system 100 may also determine defects in a system. For example, FIG. 3 illustrates defect detection using patch-wise codebook learning.

For example, given an input image x at test, the trained PVQAE system 100 may identify defects by estimating the anomaly score $s_{i,j}$ for each image patch (e.g., 310(1), 310(2), 310(30) ..., 310(n)) indexed at i, j from the assigned codes $z_q$.

Figure 3:
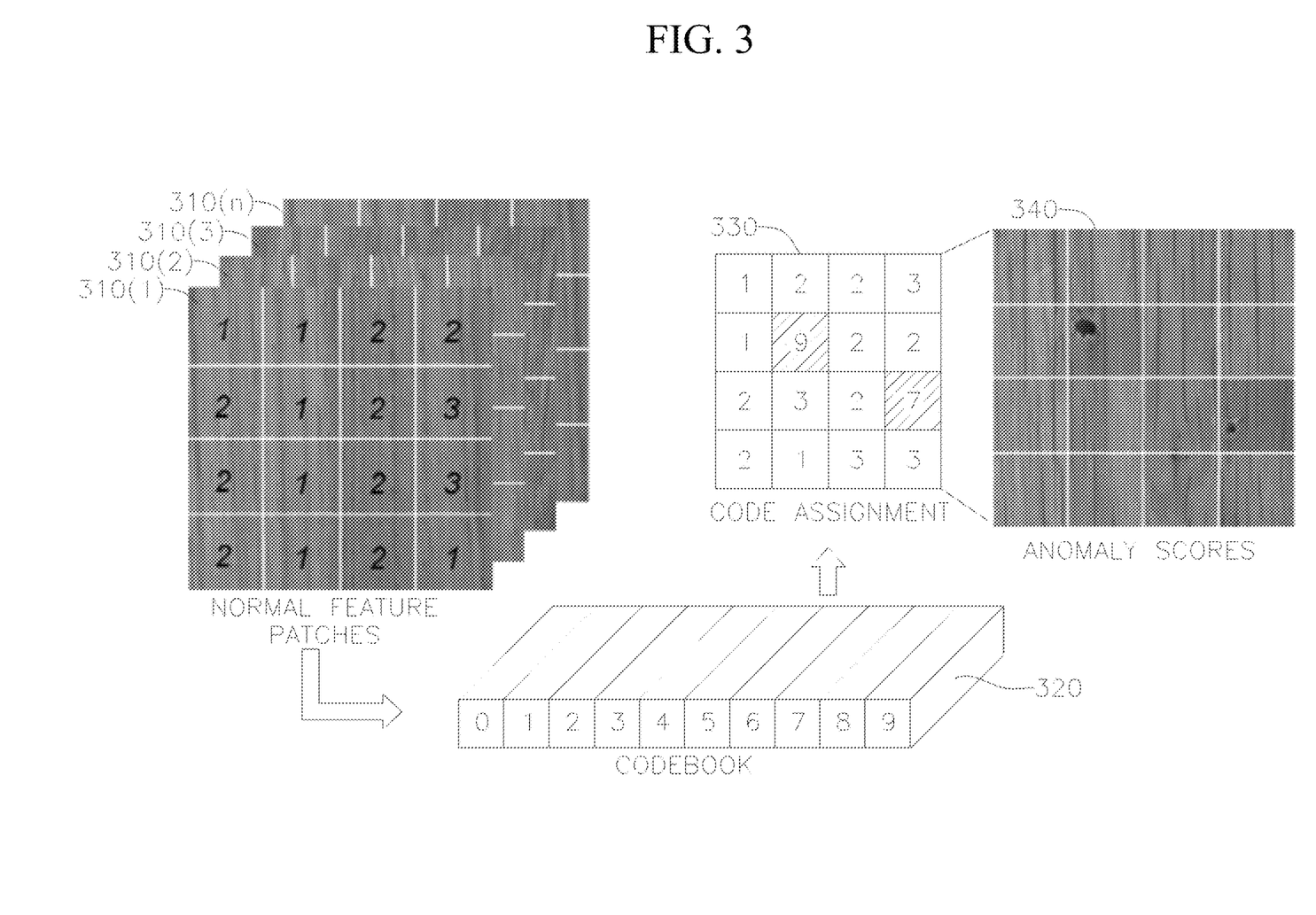
FIG. 3 illustrates defect detection using patch-wise codebook learning, in accordance with some embodiments.

As in the training phase, in the embodiment of FIG. 3, an input image x at test may be divided into a plurality of image patches, latent features from the plurality of image patches of the input image x at test may be extracted, and an image patch of the plurality of image patches may be encoded into the latent feature vector $\hat{z}$ (shorthand for $z_{i,j}$) by the encoder (E) 120. In FIG. 3, the elements 310(1), 310(2), 310(3) ..., 310(n) represent the latent feature vector $\hat{z}$ representation of the image patches of the input image x at test. Then the $k^{th}$ code from the codebook (Q) 320 that is of the shortest distance to the latent feature vector $\hat{z}$ among all the codes in the codebook (Q) 320 (e.g., based on the similarity measure between the latent feature vector $\hat{z}$ representation of the input image patch and the $k^{th}$ code from the codebook (Q) 320) is assigned to the image patch (e.g., 310(1), 310(2), 310(3) ..., 310(n)) by the encoder (E) 120. In one or more embodiments, the $k^{th}$ code from the codebook (Q) 140 may be represented as:

$$k = \mathrm{argmin}_{k \in 1,2,\ldots,K} \|\hat{z} - q_k\|_2^2 \qquad (6)$$

With all image patches, the latent feature vector $\hat{z}$ is extracted and a patch-set 330 of the corresponding codes is determined by the encoder (E) 120. The patch-set 330 of the corresponding codes may be represented as:

$$\{\hat{z} \mathrm{argmin}_{k \in 1,2,\ldots,K} \|\hat{z} - q_k\|_2^2 = k\}_{k=1,2,\ldots,K} \qquad (7)$$

In one or more embodiments, the patch-set 330 may include the assigned codes corresponding to each of the plurality of image patches (e.g., 310(1), 310(2), 310(3) ..., 310(n)).

For each entry in the patch-set 330, an anomaly score $s_{i,j} \in R$ may be calculated using either the probability density function $s_{i,j} = P(\hat{z})$, or weighted distance to the k nearest-neighbors in the patch-set 330. For example, in FIG. 3, an anomaly scoring matrix (s) 340 incorporates the anomaly score $s_{i,j}$ for each entry in the patch-set 330. In one or more embodiments, the anomaly score $s_{i,j}$ may be represented as:

$$s_{i,j} = \left(1 - \frac{\exp(\|\hat{z} - q_k\|_2^2)}{\sum_{\hat{z}' \in N_k(\hat{z})} \exp(\|\hat{z} - q_k\|_2^2)}\right) \times s_{i,j} \qquad (8)$$

In one or more embodiments, the patch-wise anomaly score $s_{i,j}$ may be reorganized into the anomaly scoring matrix (s) 340 according to the spatial location of the anomaly scores $s_{i,j}$. In one or more embodiments, the anomaly score $s_{i,j}$ may be calculated by the encoder (E) 120.

In one or more embodiments, during the defect detection, an input sample is determined to be defective if any of the anomaly scores $s_{i,j}$ is larger than a given threshold at index k, which may be represented as:

$$\Pi(s_{i,j} > t_k) \forall s_{i,j} \in s \qquad (9)$$

As such, one or more embodiments of the present disclosure provide a PVQAE system for one-class defect detection problems in manufacturing. The PVQAE system of the present disclosure may be trained sorely on normal data, hence largely reducing the need for defect samples at the training time. The principle of PVQAE system is based on learning and matching normal representations in a learned codebook. By leveraging the vector quantization technique, codebook learning in an end-to-end fashion may be achieved. PVQAE system of the present disclosure may eliminate complicated tuning or trade-offs that are specific to different datasets. In one or more embodiments, representation learning of global context may also be enhanced by combining the CNN encoder and multi-head self-attention mechanism. This approach may lead to a successful encoding of a wide range of visual patterns. In one or more embodiments, the high expressivity of the codebook may help to achieve representation learning for different objects using a single model. In addition, in one or more embodiments, the context-rich codebook may further benefit other downstream tasks such as image reconstruction or synthesis of normal images.

Figure 4:
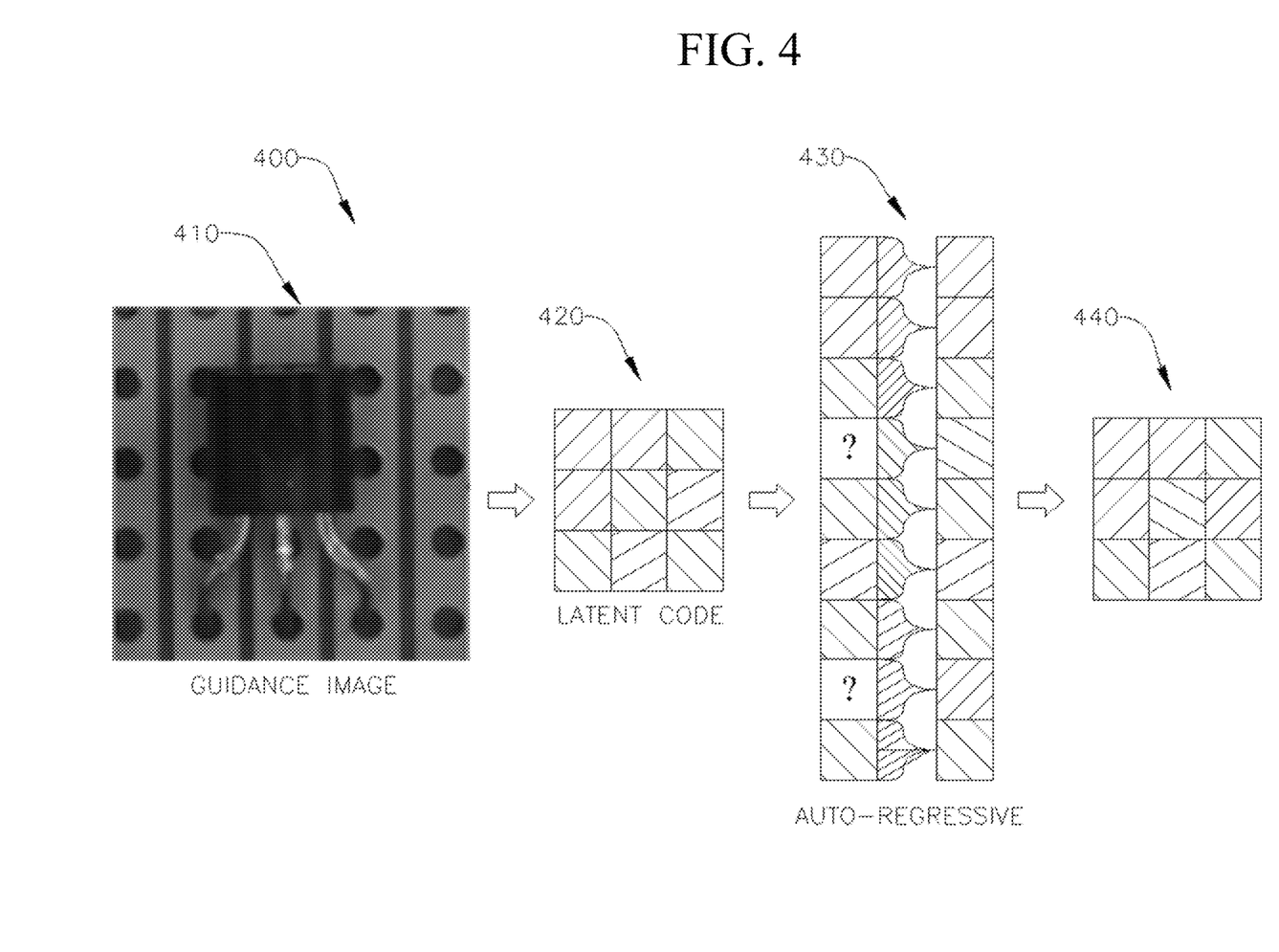
FIG. 4 illustrates an autoregressive image generation model based on the PVQAE system of FIG. 1, in accordance with some embodiments.

FIG. 4 illustrates an autoregressive image generation model based on the learned codebook of the PVQAE system 100 of FIG. 1.

In the autoregressive model 400 for an artificial image generation, instead of directly generating the image, the autoregressive model T may be adopted on the code indices k. The synthesized code entry $k_s = T(k)$ are then passed to the decoder (e.g., the decoder (G) 160) to generate new synthesized images.

For example, as shown in FIG. 4, latent features may be extracted from an guidance image 410. Next, a latent code matrix 420 including the extracted latent features from the guidance image 410 may be generated. Next, an autoregressive model 430 may be trained using the learned codebook (Q) 140 and the latent code matrix 420 to learn the latent correlation between codes and thus generate code sequences 440 or generated code matric 440 with controlled likelihood. Each code in the generated code matrix 440 may be a code from the learned codebook (Q) 140 that is of a shortest distance to the corresponding latent feature of the guidance image 410. Next, an artificial image may be reconstructed from the code sequence or the generated code matrix 440 with high quality and resolution by a decoder (e.g., decoder (G) 160).

Figure 5:
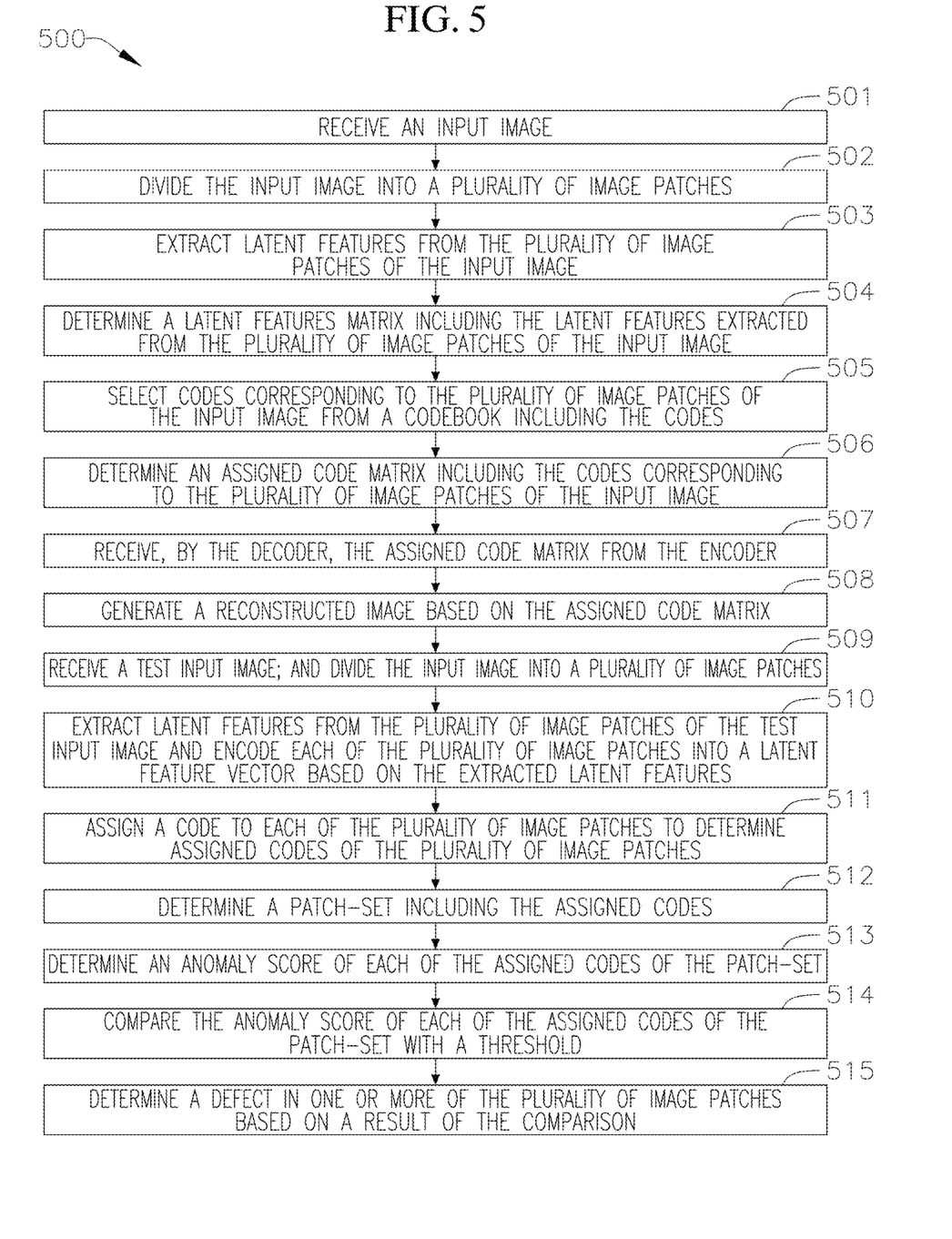
FIG. 5 illustrates a method for defect detection using the PVQAE system, in accordance with some embodiments.

FIG. 5 illustrates a method for defect detection using the PVQAE system 100.

For example, at 501, an input image may be received at an encoder, and at 502, the input image may be divided into a plurality of image patches. For example, as discussed with respect to FIG. 1, when the input image (x) is received at the encoder (E) 120, the input image (x) may be divided into a plurality of image patches.

At 503, the latent features from the plurality of image patches of the input image may be extracted by the encoder, and at 504, a latent features matrix including the latent features extracted from the plurality of image patches of the input image may be determined by the encoder. For example, as discussed with respect to FIG. 1, a latent feature from each of the plurality of patches may be extracted to determine the latent feature matrix (z) 130, where $z \in R^{(h \times w \times n_z)}$ and $z=E(x)$.

For example, at 505, codes corresponding to the plurality of image patches of the input image may be selected by the encoder from a codebook including the codes. For example, as discussed with respect to FIG. 1, after the latent feature matrix (z) 130 is determined by the encoder (E) 120, a code for each image patch is selected (or assigned) from the codebook (Q) 140 using a look-up function q(.) by the encoder (E) 120.

At 506, an assigned code matrix including the codes corresponding to the plurality of image patches of the input image may be generated by the encoder. For example, as discussed with respect to FIG. 1, by comparing the similarity measures (e.g., euclidean distance, mahalanobis distance, etc.) between the latent feature representation of an input image patch in the latent feature matrix (z) 130 and each code in the codebook (Q) 140, the look-up function q(.) selects the nearest code as an assignment for each latent feature in the latent feature matrix (z) 130 to generate the assigned code matrix (q) 150.

At 507, the assigned code matrix from the encode may be received by the decoder, and at 508, the decoder generates a reconstructed image based on the assigned code matrix. For example, as discussed with respect to FIG. 1, the assigned code matrix (q) 150 is passed to the decoder (G) 160 to generate a reconstructed image or a reconstructed input image (x̂) from the elements of the assigned code matrix (q) 150.

At 509, a test input image may be received at the encoder and divided into a plurality of image patches. For example, as discussed with respect to FIG. 3, an input image x at test received at the encoder may be divided into a plurality of image patches.

At 510, latent features from the plurality of image patches of the test input image may be extracted by the encoder and each of the plurality of image patches may be encoded into a latent feature vector based on the extracted latent features. For example, as discussed with respect to FIG. 3, after the input image x at test is divided into a plurality of image patches, an image patch of the plurality of image patches may be encoded into the latent feature vector ẑ (shorthand for $z_{i,j}$) by the encoder (E) 120.

Next, at 511, a code may be assigned to each of the plurality of image patches to determine assigned codes of the plurality of image patches. For example, as discussed with respect to FIG. 3, the $k^{th}$ code from the codebook (Q) 320 that is of the shortest distance to the latent feature vector ẑ among all the codes in the codebook (Q) 320 (based on the similarity measure between the latent feature vector ẑ representation of the input image patch and the $k^{th}$ code from the codebook (Q) 320) is assigned to the image patch (e.g., 310(1), 310(2), 310(3) . . . , 310(n)) by the encoder (E) 120.

At 512, a patch-set including the assigned codes may be determined by the encoder. For example, as discussed with respect to FIG. 3, with all image patches, the latent feature vector ẑ are extracted and a patch-set 330 of the corresponding codes is determined by the encoder (E) 120, where the patch-set 330 may include the assigned codes corresponding to each of the plurality of image patches (e.g., 310(1), 310(2), 310(3) . . . , 310(n)).

At 513, an anomaly score of each of the assigned codes of the patch-set may be determined by the encoder. For example, as discussed with respect to FIG. 3, for each entry in the patch-set 330, an anomaly score $s_{i,j} \in R$ may be calculated using either the probability density function $s_{i,j}=P(ẑ)$, or weighted distance to the k nearest-neighbors in the patch-set 330.

At 514, the anomaly score of each of the assigned codes of the patch-set may be compared with a threshold by the encoder, and at 515, a defect in one or more of the plurality of image patches may be determined by the encoder based on a result of the comparison. For example, as discussed with respect to FIG. 3, during the defect detection, an input sample is determined to be defective if any of the anomaly scores $s_{i,j}$ is larger than a given threshold at index k.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are examples only. One skilled in the art may recognize various alternative embodiments from those specifically disclosed. Those alternative embodiments are also intended to be within the scope of this disclosure. As such, the embodiments are limited only by the following claims and their equivalents.

What is claimed is:

1. A system comprising:
   a memory,
   an encoder;
   a decoder; and
   a processor, the processor being connected to the memory, the encoder, and the decoder, wherein the system is configured to:
   receive, at the encoder, an input image;
   divide, by the encoder, the input image into a plurality of image patches;
   extract, by the encoder, a latent feature from an image patch of the plurality of image patches, wherein the latent feature comprises a height, a width, or a hidden vector size of the image patch;
   select, by the encoder, codes corresponding to the plurality of image patches of the input image, from a codebook comprising the codes based on the latent feature of the image patch;
   determine, by the encoder, an assigned code matrix comprising the codes corresponding to the plurality of image patches of the input image;
   receive, by the decoder, the assigned code matrix from the encoder; and
   generate, by the decoder, a reconstructed image based on the assigned code matrix.

2. The system of claim 1, wherein the codes corresponding to the plurality of image patches of the input image are selected from the codebook using a look-up function, wherein the look-up function, the codebook, and the assigned code matrix are stored in the memory.

3. The system of claim 2, wherein the system is further configured to:
determine, by the encoder, a latent feature matrix comprising the latent feature extracted from the image patch.

4. The system of claim 3, wherein the look-up function is configured to select a nearest code as an assignment for the latent feature in the latent feature matrix to determine the assigned code matrix.

5. The system of claim 3, wherein the encoder is configured to select a code corresponding to the image patch from the codebook by comparing similarity measures between a latent feature representation of the image patch in the latent feature matrix and a corresponding code in the codebook.

6. The system of claim 5, wherein the similarity measures comprise an euclidean distance or a mahalanobis distance between the latent feature representation of the image patch in the latent feature matrix and the corresponding code in the codebook.

7. The system of claim 1, wherein a code from among the codes in the assigned code matrix is assigned to the image patch based on a vector quantization of a latent feature corresponding to the image patch.

8. The system of claim 7, wherein a vector quantization loss of the system comprises a reconstruction loss that occurs during generation of the reconstructed image and a loss that occurs during the vector quantization of latent features corresponding to the plurality of image patches of the input image.

9. The system of claim 8, further comprising:
a patch-wise discriminator network configured to operate as a generative adversarial network to determine an adversarial training loss between the input image and the reconstructed image.

10. The system of claim 9, wherein a total loss of the system in generating the reconstructed image from the input image comprises the vector quantization loss and the adversarial training loss.

11. The system of claim 1, further configured to:
receive, by the encoder, a test input image;
divide, by the encoder, the test input image into a plurality of test image patches;
extract, by the encoder, latent features from the plurality of test image patches of the test input image;
encode, by the encoder, each of the plurality of test image patches into a latent feature vector based on the extracted latent features;
assign, by the encoder, a code to each of the plurality of test image patches to determine assigned codes of the plurality of test image patches;
determine, by the encoder, a patch-set comprising the assigned codes;
determine, by the encoder, an anomaly score of each of the assigned codes of the patch-set;
compare, by the encoder, the anomaly score of each of the assigned codes of the patch-set with a threshold; and
determine, by the encoder, a defect in one or more of the plurality of test image patches based on a result of the comparison.

12. The system of claim 11, wherein a code from the codebook that is of a shortest distance to the latent feature vector of a test image patch of the plurality of test image patches among the codes in the codebook is assigned to the test image patch.

13. The system of claim 11, wherein the anomaly score of each of the assigned codes of the patch-set is determined based on a probability density function.

14. A method comprising:
receiving, at an encoder, an input image;
dividing, at the encoder, the input image into a plurality of image patches;
extract, by the encoder, a latent feature from an image patch of the plurality of image patches, wherein the latent feature comprises a height, a width, or a hidden vector size of the image patch;
selecting, by the encoder, codes corresponding to the plurality of image patches of the input image, from a codebook comprising the codes based on the latent feature of the image patch;
determining, by the encoder, an assigned code matrix comprising the codes corresponding to the plurality of image patches of the input image;
receiving, by a decoder, the assigned code matrix from the encoder; and
generating, by the decoder, a reconstructed image based on the assigned code matrix.

15. The method of claim 14, wherein the codes corresponding to the plurality of image patches of the input image are selected from the codebook using a look-up function, wherein the method further comprises:
determining, by the encoder, a latent feature matrix comprising the latent feature extracted from the image patch.

16. The method of claim 15, wherein the look-up function is configured to select a nearest code as an assignment for the latent feature in the latent feature matrix to determine the assigned code matrix, and
wherein the encoder is configured to select a code corresponding to the image patch from the codebook by comparing similarity measures between a latent feature representation of the image patch in the latent feature matrix and a corresponding code in the codebook.

17. The method of claim 16, wherein a code from among the codes in the assigned code matrix is assigned to the image patch based on a vector quantization of a latent feature corresponding to the image patch,
wherein a vector quantization loss comprises a reconstruction loss that occurs during generation of the reconstructed image and a loss that occurs during the vector quantization of the latent feature corresponding to the image patch, and
wherein a total loss for generating the reconstructed image from the input image comprises the vector quantization loss and an adversarial training loss.

18. The method of claim 14, further comprising:
extracting, by the encoder, latent features from the plurality of image patches of the input image;
encoding, by the encoder, each of the plurality of image patches into a latent feature vector based on the extracted latent features;
assigning, by the encoder, a code to each of the plurality of image patches to determine assigned codes of the plurality of image patches;
determining, by the encoder, a patch-set comprising the assigned codes;
determining, by the encoder, an anomaly score of each of the assigned codes of the patch-set;

compare, by the encoder, the anomaly score of each of the assigned codes of the patch-set with a threshold; and determine, by the encoder, a defect in one or more of the plurality of image patches based on a result of the comparison.

19. A non-transitory computer readable storage medium configured to store instructions that, when executed by a processor included in a computing device, cause the computing device to:

receive, at an encoder of the computer device, an input image;

divide, at the encoder, the input image into a plurality of image patches;

extract, by the encoder, a latent feature from an image patch of the plurality of image patches, wherein the latent feature comprises a height, a width, or a hidden vector size of the image patch;

select, by the encoder, codes corresponding to the plurality of image patches of the input image, from a codebook comprising the codes based on the latent feature of the image patch;

determine, by the encoder, an assigned code matrix comprising the codes corresponding to the plurality of image patches of the input image;

receive, by a decoder of the computer device, the assigned code matrix from the encoder; and generate, by the decoder, a reconstructed image based on the assigned code matrix.

* * * * *